US012627636B2

(12) United States Patent
Zheng et al.

(10) Patent No.: US 12,627,636 B2
(45) Date of Patent: May 12, 2026

(54) INTERNET OF THINGS SYSTEM, AUTHENTICATION AND COMMUNICATION METHOD THEREFOR, AND RELATED DEVICE

(71) Applicant: BOE Technology Group Co., Ltd., Beijing (CN)

(72) Inventors: Haitao Zheng, Beijing (CN); Hongda Yu, Beijing (CN); Huailiang Wang, Beijing (CN); Hongjun Du, Beijing (CN); Gao Ji, Beijing (CN); Guoqi Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 77 days.

(21) Appl. No.: 18/709,826

(22) PCT Filed: May 25, 2023

(86) PCT No.: PCT/CN2023/096285
§ 371 (c)(1),
(2) Date: May 14, 2024

(87) PCT Pub. No.: WO2023/241331
PCT Pub. Date: Dec. 21, 2023

(65) Prior Publication Data
US 2025/0007889 A1     Jan. 2, 2025

(30) Foreign Application Priority Data
Jun. 17, 2022     (CN) .......................... 202210692570.6

(51) Int. Cl.
*H04L 9/40*          (2022.01)
*H04L 67/12*         (2022.01)

(52) U.S. Cl.
CPC ...... *H04L 63/0281* (2013.01); *H04L 63/0823* (2013.01); *H04L 67/12* (2013.01)

(58) Field of Classification Search
CPC . H04L 63/0281; H04L 63/0823; H04L 67/12; H04L 63/0884; H04L 63/166; H04L 9/3263; H04L 63/0807
See application file for complete search history.

(56) References Cited

U.S. PATENT DOCUMENTS

2008/0209524 A1      8/2008  Almog et al.
2017/0187699 A1*     6/2017  Gillmore ............... H04L 63/067
(Continued)

FOREIGN PATENT DOCUMENTS

CN          111711627  A        9/2020
CN          113098863  A        7/2021
(Continued)

OTHER PUBLICATIONS

International Search Report for PCT/CN2023/096285 Mailed Aug. 18, 2023.
(Continued)

*Primary Examiner* — Javier O Guzman
(74) *Attorney, Agent, or Firm* — Ling Wu; Stephen Yang; Ling and Yang Intellectual Property

(57)          ABSTRACT

An Internet of Things system, an authentication and communication method therefor, and a related device. The Internet of Things system comprises: an Internet of Things terminal, configured to establish a connection with a proxy server by using a connection certificate of the Internet of Things terminal, and send device information and an authentication identifier of the Internet of Things terminal to the proxy server; the proxy server, configured to receive the device information and the authentication identifier, and send the device information and the authentication identifier
(Continued)

to an Internet of Things platform; and the Internet of Things platform, configured to receive the device information and the authentication identifier, perform identity verification on the Internet of Things terminal according to the device information and the authentication identifier, and in response to the fact that the verification passes, return a verification success message to the proxy server.

14 Claims, 3 Drawing Sheets

(56) References Cited

U.S. PATENT DOCUMENTS

| 2017/0310660 | A1 | 10/2017 | Newton et al. | |
| 2018/0338242 | A1* | 11/2018 | Li | H04W 12/041 |
| 2019/0245845 | A1* | 8/2019 | Marinho | H04L 63/102 |
| 2020/0045546 | A1 | 2/2020 | Zhou | |
| 2020/0177589 | A1* | 6/2020 | Mangalvedkar | H04W 4/50 |
| 2022/0109663 | A1 | 4/2022 | Swain et al. | |
| 2023/0179632 | A1* | 6/2023 | Duraisamy | H04L 9/3213 |
| | | | | 726/9 |
| 2024/0388453 | A1* | 11/2024 | Zheng | H04L 63/18 |

FOREIGN PATENT DOCUMENTS

| CN | 113794729 | A | 12/2021 | |
| CN | 114124451 | A | 3/2022 | |
| CN | 115065703 | A | 9/2022 | |
| KR | 10-2017-0011388 | A | 2/2017 | |
| WO | 2017176051 | A1 | 10/2017 | |
| WO | WO-2018232111 | A1 * | 12/2018 | H04L 63/0853 |

OTHER PUBLICATIONS

Office Action dated Dec. 15, 2023 for Chinese Patent Application No. 202210692570.6 and English Translation.

* cited by examiner

INTERNET OF THINGS SYSTEM, AUTHENTICATION AND COMMUNICATION METHOD THEREFOR, AND RELATED DEVICE

CROSS-REFERENCE TO RELATED APPLICATION

This application is a U.S. National Phase Entry of International Application No. PCT/CN2023/096285 having an international filing date of May 25, 2023, which claims priority of Chinese patent application No. 202210692570.6, filed to the CNIPA on Jun. 17, 2022, and entitled "Internet of Things System, Authentication and Communication Method Therefor, and Related Device". The above-identified applications are incorporated into this application by reference in their entireties.

TECHNICAL FIELD

An embodiment of the disclosure relates to, but is not limited to, the technical field of the Internet of Things, in particular to an Internet of Things system, an authentication and communication method therefor, and a related device.

BACKGROUND

At present, the authentication process and communication establishment process of Internet of Things devices are independent of each other, which leads to low work efficiency.

SUMMARY

The following is a summary of subject matters described herein in detail. This summary is not intended to limit the protection scope of claims.

In a first aspect of the present disclosure, an Internet of Things system is provided, including:

an Internet of Things terminal, configured to establish a connection with a proxy server by using a connection certificate of the Internet of Things terminal, and send device information and an identity sign of the Internet of Things terminal to the proxy server;

the proxy server, configured to receive the device information and the identity sign, and send the device information and the identity sign to an Internet of Things platform; and the Internet of Things platform, configured to receive the device information and the identity sign, perform an identity authentication on the Internet of Things terminal according to the device information and the identity sign, and return an authentication success message to the proxy server in response to the identity authentication passing;

wherein the proxy server is further configured to establish a communication connection with the Internet of Things terminal in response to receiving the authentication success message.

In a second aspect of the present disclosure, an authentication and communication method for an Internet of Things system is provided, including:

establishing, by an Internet of Things terminal, a connection with a proxy server by using a connection certificate, and sending device information and an identity sign of the Internet of Things terminal to the proxy server;

receiving, by the proxy server, the device information and the identity sign, and sending the device information and the identity sign to an Internet of Things platform;

receiving, by the Internet of Things platform, the device information and the identity sign, and performing an identity authentication on the Internet of Things terminal according to the device information and the identity sign;

returning, by the Internet of Things platform, an authentication success message to the proxy server in response to the identity authentication passing; and establishing, by the proxy server, a communication connection with the Internet of Things terminal in response to receiving the authentication success message.

In a third aspect of the present disclosure, an authentication and communication method for an Internet of Things system, applied to an Internet of Things terminal, is provided, including:

using a connection certificate of an Internet of Things terminal to establish a connection with a proxy server and sending device information and an identity sign of the Internet of Things terminal to the proxy server for the proxy server to send the device information and the identity sign to an Internet of Things platform, and establishing a communication connection between the proxy server and the Internet of Things terminal after an identity authentication passes.

In a fourth aspect of the present disclosure, an authentication and communication method for an Internet of Things system, applied to a proxy server, is provided, including:

receiving device information and the identity sign sent by an Internet of Things terminal, and sending the device information and the identity sign to an Internet of Things platform for the Internet of Things platform to perform an identity authentication on the Internet of Things terminal according to the device information and the identity sign; and establishing a communication connection with the Internet of Things terminal in response to receiving an authentication success message.

In a fifth aspect of the present disclosure, an authentication and communication method for an Internet of Things system, applied to an Internet of Things platform, is provided, including:

receiving device information and an identity sign forwarded by a proxy server and sent by an Internet of Things terminal, and performing an identity authentication on the Internet of Things terminal according to the device information and the identity sign, and in response to the identity authentication passing, returning an authentication success message to the proxy server for the proxy server to establish a communication connection with the Internet of Things terminal in response to receiving the authentication success message.

In a sixth aspect of the present disclosure, a computer device is provided, including at least one processor, and a memory storing a computer program executable on the processor; wherein instructions of the methods as described in the second aspect, the third aspect, the fourth aspect and the fifth aspect are implemented when the processor executes the program.

In a seventh aspect of the present disclosure, a non-volatile computer-readable storage medium including a computer program is provided, wherein when the computer program is executed by one or more processors, the processor is caused to perform the methods as described in the second aspect, the third aspect, the fourth aspect and the fifth aspect.

In an eighth aspect of the present disclosure, a computer program product including computer program instructions is provided, wherein when the computer program instructions are run on a computer, the computer is caused to perform the methods as described in the second aspect, the third aspect, the fourth aspect and the fifth aspect.

Other aspects of the present disclosure may be comprehended after the drawings and the detailed descriptions are read and understood.

BRIEF DESCRIPTION OF DRAWINGS

In order to describe technical solutions in the present disclosure or related technologies more clearly, the drawings to be used in describing the embodiments or related technologies will be introduced below in brief Apparently, the drawings described below are only embodiments of the present disclosure, and those of ordinary skills in the art may also obtain other drawings according to these drawings without paying any inventive effort.

DETAILED DESCRIPTION

The present disclosure is described below in further details in combination with embodiments with reference to the drawings.

Unless otherwise defined, technical terms or scientific terms used in the embodiments of the present disclosure shall have common meanings understood by people with ordinary skills in the field to which the present disclosure pertains. "First", "second", and similar terms used in the embodiments of the present disclosure do not represent any order, quantity, or importance, but are only used for distinguishing different components. "Include", "contain", or similar words mean that elements or objects appearing before the words cover elements or objects listed after the words and their equivalents, but do not exclude other elements or objects. "Connect", "couple", or similar words are not limited to a physical or mechanical connection, but may include an electrical connection, whether direct or indirect. "Upper", "lower", "left", and "right", etc., are used for representing a relative positional relationship, and when an absolute position of a described object is changed, the relative positional relationship may also be correspondingly changed.

Figure 1:
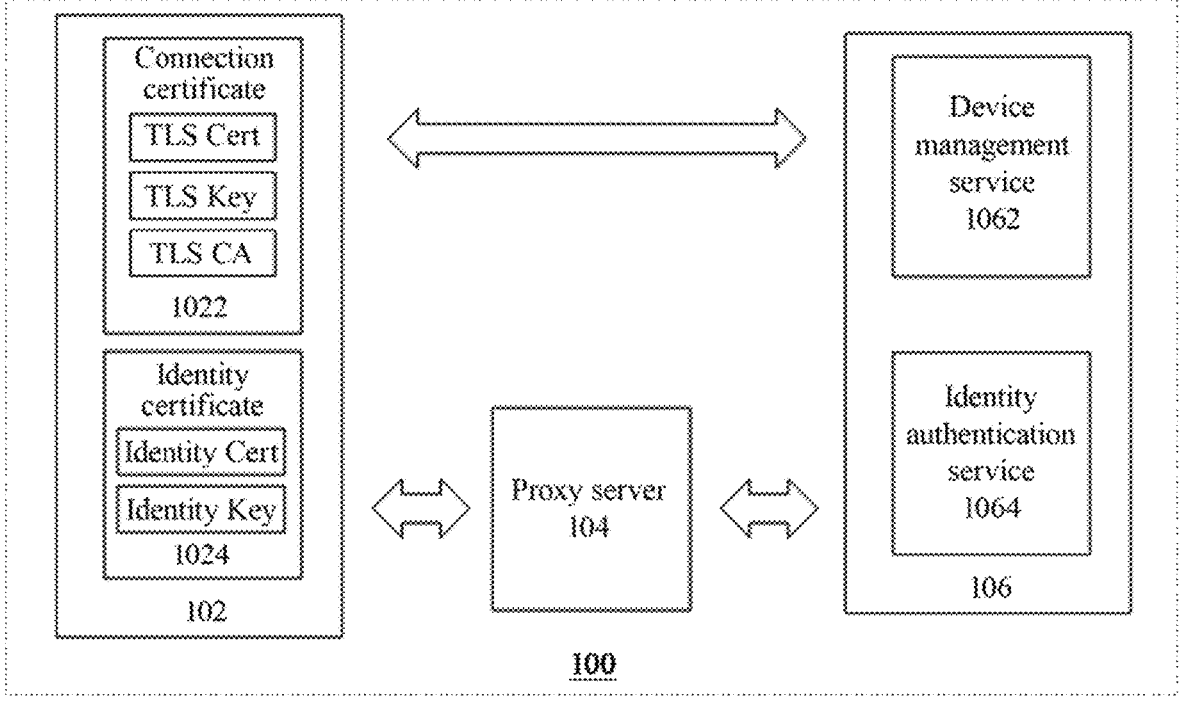
FIG. 1 is a schematic diagram of an Internet of Things system according to an embodiment of the present disclosure.

FIG. 1 is a schematic diagram of an Internet of Things System 100 according to an embodiment of the present disclosure.

As shown in FIG. 1 the system 100 may include an Internet of Things terminal 102, a proxy server 104 and an Internet of Things platform 106.

The Internet of Things terminals 102 may be various Internet of Things terminal devices, for example, smart air conditioners, smart integrated lighting systems and the like. For the convenience of illustration, only one Internet of Things terminal 102 is shown in FIG. 1. In fact, there may be more Internet of Things terminals in the Internet of Things System 100, all of which may adopt the methods according to embodiments of the present disclosure and have corresponding technical effects.

The proxy server (Broker) 104 may be configured to provide one or more message queuing services, for example, a Message Queuing Telemetry Transport (MQTT) service, a Kafka service, or the like. In some embodiments, a connection between the proxy server 104 and the Internet of Things terminal 102 may be established based on Transport Layer Security (TLS), thereby ensuring the security of communication.

The Internet of Things platform 106 may be configured to provide services related to the Internet of Things system 100 and may further include a device management service 1062 and an identity authentication service 1064.

Herein, the device management service 1062 may be configured to be responsible for managing the life cycle of one or more Internet of Things terminals 102 in the system 100, including device registration, device status management and the like. In some embodiments, the device management service 1062 may authenticate a device availability based on device information (e.g., Product Serial Number (SN)), thereby determining the availability of the device prior to the identity authentication. If the device is unavailable, subsequent authentication procedures may not be performed, and an authentication failure message may be directly returned, thereby improving authentication efficiency.

The identity authentication service 1064 may be configured to manage the certificates of the devices and perform an identity authentication on the devices based on the certificates.

With the increasing number of Internet of Things devices in people's lives and the complexity of Internet communication environment, people pay more and more attention to the security of private devices. Due to the authentication manner of the Internet of Things device of some embodiments (for example, directly using the inherent information (SN code, MAC address, etc.) of the device to authenticate the device identity), there is a great possibility of leaking the key information of the device.

In view of this, in some embodiments, the Internet of Things terminal 102 may be registered on the Internet of Things platform 106 before leaving the factory. When the Internet of Things terminal 102 is successfully registered, the identity authentication service 1064 may issue two certificates for the Internet of Things terminal 102, i.e., a connection certificate 1022 for establishing a communication connection and an identity certificate 1024 for authenticating the device identity. The Internet of Things terminal 102 may store the two certificates as factory preset information and for subsequent identity authentication and communication. Thus, by using the confidentiality of the certificate, two certificates are issued for the Internet of Things terminal 102 to authenticate the device identity on the one hand, and to improve the security of the privacy data of the device in the authentication process and the communication process on the other hand. Therefore, the device authentication method based on double certificates improves the security.

In some embodiments, in addition to issuing certificates, the identity authentication service 1064 may be used to authenticate the certificates it issued and to manage the issued certificates.

In some embodiments, the connection certificate 1022 may be used to establish a two-way authenticated Transport Layer Security (TLS) connection with the proxy server (Broker) 104, and may include a TLS certificate (Cert), a TLS key (Key), and a TLS CA (Certificate Authority, CA) certificate.

In some embodiments, the identity certificate 1024 may be used to generate an identity challenge code and may include a certificate (Identity Cert) and a key (Identity Key).

The certificate-based authentication process and communication establishment process of the Internet of Things terminal are independent of each other. For example, when establishing communication, the Internet of Things terminal 102 needs to perform an identity authentication at the Internet of Things platform 106 at first, and only after the identity authentication passes, a communication connection with the proxy server 104 may be established, and the subsequent communication session is maintained by using either session-based or token-based manners. It may be seen that in this process, in order to achieve a communication with the Internet of Things platform 106, the Internet of Things terminal 102 needs to perform a plurality of interaction processes before it may start a communication.

In view of this, an embodiment of the disclosure provides an authentication and communication method for an Internet of Things system, which may integrate an identity authentication of an Internet of Things terminal and the connection authentication process with a proxy server, thus simplifying the device authentication and connection procedures.

Figure 2:
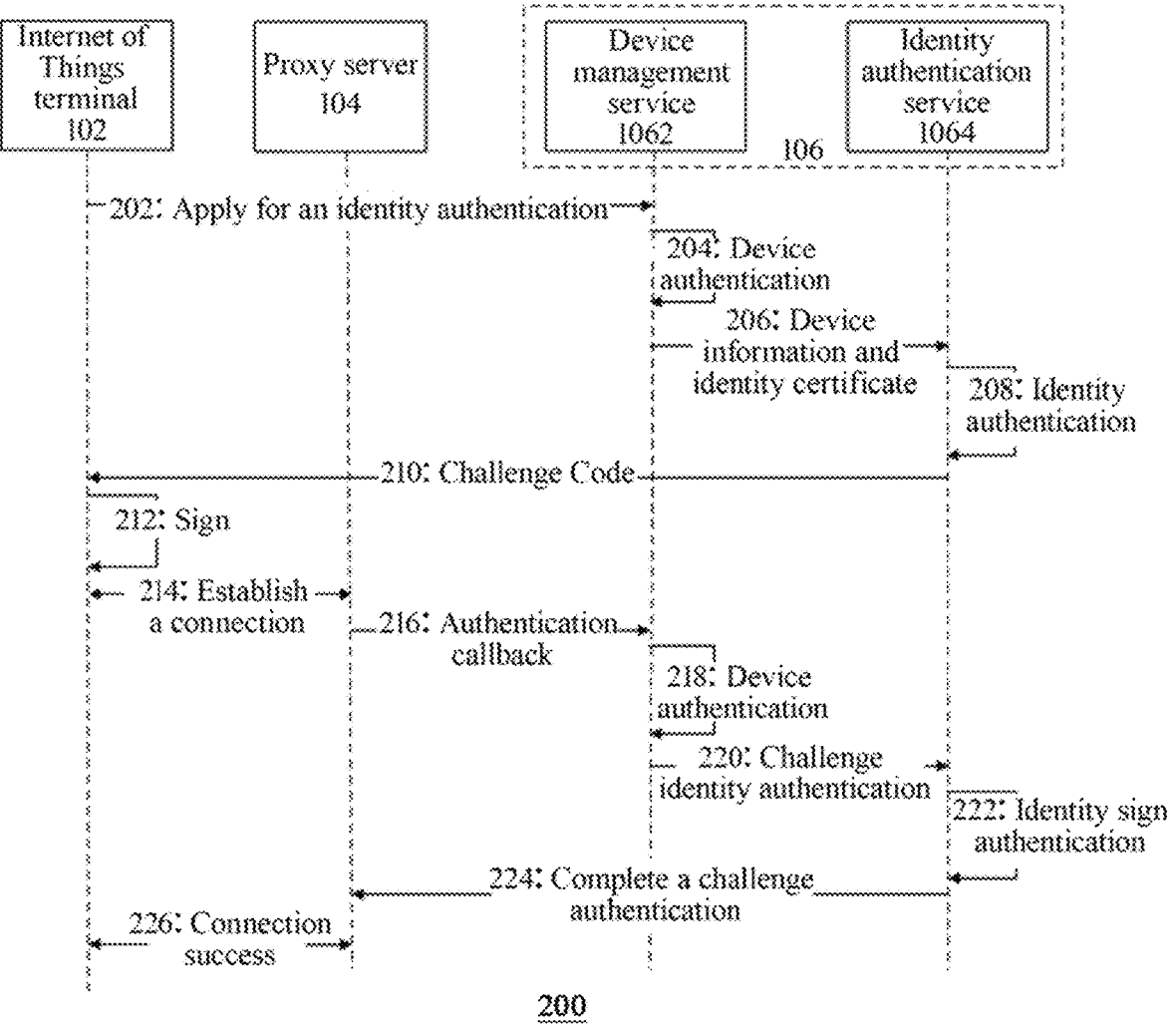
FIG. 2 is a flow diagram of an authentication and communication method for an Internet of Things system according to an embodiment of the present disclosure.

FIG. 2 is a flow diagram of an authentication and communication method 200 of an Internet of Things system according to an embodiment of the present disclosure.

As shown in FIG. 2, the method 200 may be applied to the system 100 of FIG. 1 and may include the following acts.

In an initial state, as shown in FIG. 2, in some embodiments, at act 202, the Internet of Things terminal 102 may first apply for an identity authentication to the Internet of Things platform 106, for example, by sending an identity authentication request, which may include device information (e.g., SN code) of the Internet of Things terminal 102 and an identity certificate 1024 of the Internet of Things terminal 102. In some embodiments, the sent Identity certificate 1024 may include only the certificate Identity Cert in the identity certificate 1024, so that the identity authentication service 1064 may authenticate the certificate Identity Cert according to the information it stores.

At act 204, the device management service 1062 may perform a device authentication on the Internet of Things terminal based on the device information, for example authenticating the availability of the Internet of Things terminal. The availability may refer to, for example, whether the Internet of Things terminal is a legally registered device in the system 100. Based on the foregoing, the Internet of Things terminal 102 needs to perform device registration on the Internet of Things platform 106 before leaving the factory. Therefore, the Internet of Things platform 106 can store the device information provided by the Internet of Things terminal 102 during registration, and the device management service 1062 may determine whether the device is a legally registered device by searching the device information locally stored by the Internet of Things platform 106.

At act 206, in response to determining that the Internet of Things terminal 102 is an available device, the device management service 1062 may send the device information and the identity certificate 1024 (e.g., Identity Cert) to the identity authentication service 1064. When the device is unavailable, the device management service 1062 may directly return an authentication failure message to the Internet of Things terminal 102 to prompt that it may not have completed the registration.

At act 208, the identity authentication service 1064 may perform an identity authentication on the Internet of Things terminal according to the device information and the identity certificate. In some embodiments, the identity authentication service 1064 primarily authenticates the certificate Identity Cert of the identity certificate 1024.

At act 210, the identity authentication service 1064 may, in response to the identity authentication passing (e.g., the certificate authentication succeeds), generate a Challenge Code corresponding to the Internet of Things terminal and send the challenge code to the Internet of Things terminal 102. Challenge Code may also be called a challenge password, which generally refers to a group of encrypted passwords generated according to challenge handshake authentication Protocol (CHAP), used for ensuring that the user's real password is not leaked during transmission. When the identity authentication fails, the authentication service 1064 may directly return an authentication failure message to the Internet of Things terminal 102 to prompt that it may be an illegal device.

At act 212, the Internet of Things terminal 102 may use the Identity Key of the identity certificate 1024 to sign the challenge code and the device information to obtain an Identity Sign.

At act 214, the Internet of Things terminal 102 may establish a connection with the proxy server 104 by using the connection certificate 1022 and send the device information (e.g. SN code) of the Internet of Things terminal 102 and the identity sign to the proxy server 104.

In some embodiments, act 214 may further include that the Internet of Things terminal 102 may establish a TLS connection with the proxy server 104 by using the connection certificate 1022 so that communication security may be improved.

In some embodiments, the device information may be a user name (Username) of the TLS connection, and the identity sign may be used as a password (Secret) of the TLS connection. In this way, the device information and the identity sign may be sent to the proxy server 104 when the TLS connection is established, thereby improving the processing efficiency.

At act 216, after establishing the TLS connection with the Internet of Things terminal 102, the proxy server 104 may receive the device information and the identity sign and send the device information and the identity sign to the Internet of Things platform 106, for example, to the device management service 1062.

In some embodiments, the proxy server 104 may use the Broker's authentication callback mechanism to call back the user name (Username) and the password (Secret) to the device management service 1062 in an authentication callback manner, so that the proxy server 104 initiates an identity authentication request for the Internet of Things terminal 102 to the device management service 1062.

Then, the Internet of Things platform 106 may receive the device information and the identity sign and perform an identity authentication on the Internet of Things terminal 102 according to the device information and the identity sign.

In some embodiments, the act may further include the following acts.

At act 218, the device management service 1062 may authenticate the availability of the Internet of Things terminal 102 according to the device information (e.g. SN code).

At act 220, in response to determining that the Internet of Things terminal is available, the device management service 1062 sends the device information and the identity sign to the identity authentication service 1064 for an identity authentication. Based on the foregoing, the identity sign is obtained based on the challenge code, and the identity authentication process includes authentication of the challenge code, so in some embodiments, the act may be considered as performing challenge identity authentication on the device. When the device is unavailable, the device management service 1062 may directly return an authentication failure message to the Internet of Things terminal 102 to prompt that it may not have completed registration.

At act 222, the identity authentication service 1064 may perform an identity authentication on the Internet of Things terminal 102 according to the device information and the identity sign.

Since the foregoing acts are implemented based on the Broker's authentication callback mechanism of the proxy server, the proxy server 104 may send the user name (Username) and the password (Secret) when transmitting information to the Internet of Things platform 106, wherein the user name (Username) is the device information and the password (Secret) is the identity sign. Thus, the device management service 1062 may authenticate the availability of the Internet of Things terminal 102 by using the user name (Username).

In some embodiments, act 222 may further include: searching for an identity certificate and a challenge code corresponding to the Internet of Things terminal 102 by using the device information, and then authenticating the identity sign by using the identity certificate and the challenge code obtained by searching and the device information. For example, the identity sign is authenticated based on the device information (e.g. SN code) and the challenge code by using the certificate Identity Cert of the identity certificate 1024, thereby completing identity authentication.

At act 220, the Internet of Things platform 106 returns an authentication success message to the proxy server 104 in response to the identity authentication passing to notify the proxy server 104 that the challenge authentication has been completed and the connection authentication has authenticated. When the identity authentication fails, the identity authentication service 1064 may return an authentication failure message to the proxy server 104; and in response to receiving the authentication failure message, the proxy server 104 may feed back the authentication failure message to the Internet of Things terminal 102, or disconnect the connection with the Internet of Things terminal 102 directly, or disconnect the connection with the Internet of Things terminal 102 after feeding back the authentication failure message to the Internet of Things terminal 102. Thereby communications with illegal devices are avoided and the system security is prevented from being affected.

In some embodiments, the identity authentication service 1064 may also directly return an authentication failure message to the Internet of Things terminal 102 to prompt that it may be an illegal device.

At act 222, the proxy server 104 establishes a communication connection with the Internet of Things terminal 102 in response to receiving the authentication success message. Thereafter, the Internet of Things terminal 102 may begin to communicate with the Internet of Things platform 106 through the proxy server 104 and may send and receive messages normally.

An embodiment of the present invention integrates the identity authentication of the Internet of Things terminal and the Broker connection authentication process by means of the connection authentication callback capability provided by the proxy server (Broker service), thus simplifying the device authentication and connection procedures.

The methods according to embodiments of the present disclosure may be executed by a single device, for example a computer or a server. The method in the embodiments may be applied in a distributed scenario, and is accomplished by cooperation of a plurality of devices. In such case of the distributed scenario, one of the plurality of devices may execute only one or more acts in the method in embodiments of the present disclosure, and the plurality of devices interact with each other to accomplish the method.

Some embodiments of the present disclosure are described above. Other embodiments fall within the scope of the appended claims. In some cases, actions or acts recorded in the claims may be performed in an order different from those in the above-described embodiments and may still achieve desired results. In addition, processes illustrated in the drawings do not necessarily require a specific order or continuous order illustrated to achieve the desired results. In some embodiments, multitask processing and parallel processing are feasible or possibly advantageous.

An embodiment of the present disclosure also provides an authentication and communication method for an Internet of Things system, applied to an Internet of Things terminal, including: establishing a connection with a proxy server by using a connection certificate of an Internet of Things terminal, and sending device information and an identity sign of the Internet of Things terminal to the proxy server for the proxy server to send the device information and the identity sign to an Internet of Things platform for the Internet of Things platform to perform an identity authentication on the Internet of Things terminal according to the device information and the identity sign, and establishing a communication connection between the proxy server and the Internet of Things terminal after the identity authentication passes.

An embodiment of the present disclosure also provides an authentication and communication method for an Internet of Things system, applied to a proxy server, including: receiving device information and an identity sign sent by an Internet of Things terminal, and sending the device information and the identity sign to an Internet of Things platform for the Internet of Things platform to perform an identity authentication on the Internet of Things terminal according to the device information and the identity sign; and establishing a communication connection with the Internet of Things terminal in response to receiving an authentication success message.

An embodiment of the present disclosure also provides an authentication and communication method for an Internet of Things system, applied to an Internet of Things platform, including:

receiving device information and an identity sign forwarded by a proxy server and sent by an Internet of Things terminal, and performing an identity authentication on the Internet of Things terminal according to the device information and the identity sign, and in response to the identity authentication passing, returning an authentication success message to the proxy server for the proxy server to establish a communication connection with the Internet of Things terminal in response to receiving the authentication success message.

Figure 3:
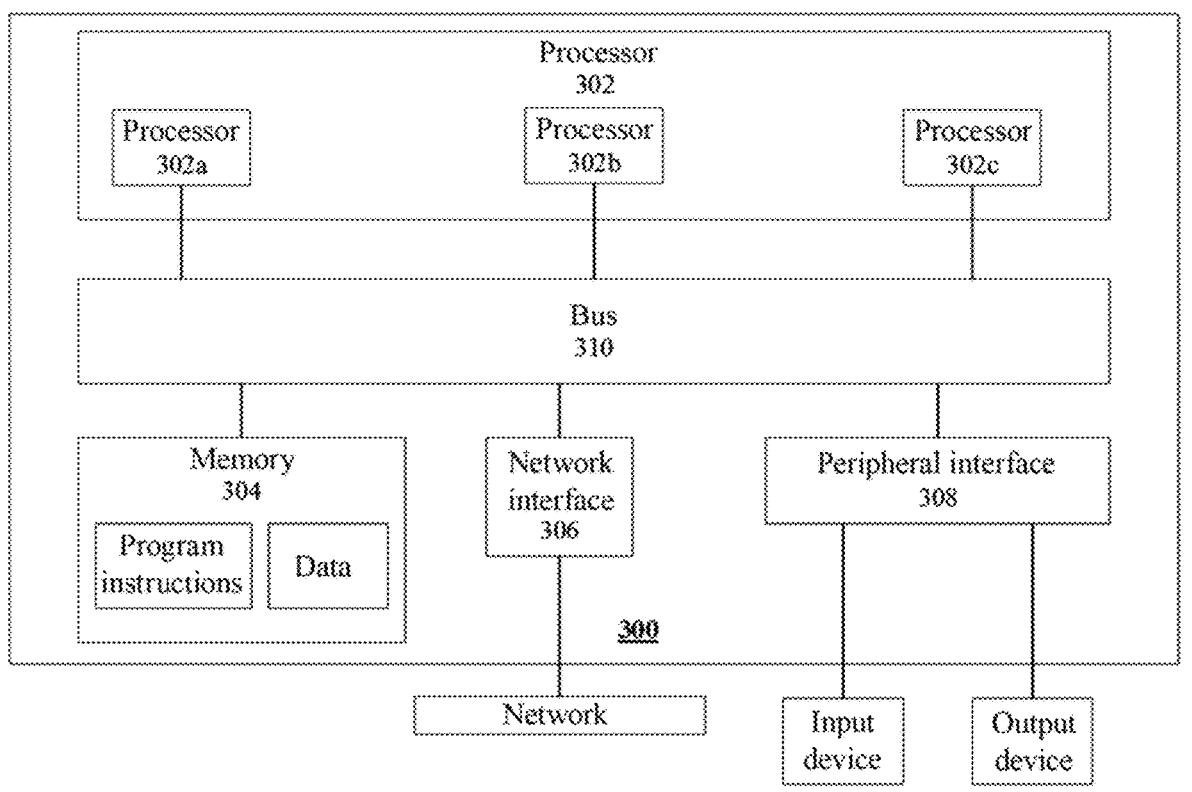
FIG. 3 is a schematic diagram of a hardware structure of an exemplary computer device according to an embodiment of the present disclosure.

An embodiment of the present disclosure also provides a computer device for implementing the above-described method 200. FIG. 3 shows a schematic diagram of a hardware structure of an exemplary computer device 300 according to an embodiment of the present disclosure. The computer device 300 may be used to implement the Internet of Things platform 106 of FIG. 1. In some scenarios, the computer device 300 may also be used to implement the Internet of Things terminal 102 and the proxy server 104 of FIG. 1.

As shown in FIG. 3, the computer device 300 may include a processor 302, a memory 304, a network module 306, a peripheral interface 308 and a bus 310. The processor 302, the memory 304, the network module 306 and the peripheral interface 308 implement communication connections with each other within the computer device 300 through the bus 310.

The processor 302 may be a Central Processing Unit (CPU), an image processor, a neural network processor (NPU), a microcontroller (MCU), a programmable logic device, a digital signal processor (DSP), an Application Specific Integrated Circuit (ASIC), or one or more integrated circuits. The processor 302 may be used to perform an authentication and communication method for the physical network system described in embodiments of the present disclosure. In some embodiments, the processor 302 may also include a plurality of processors integrated into a single logical component. For example, as shown in FIG. 3, the processor 302 may include a plurality of processors 302a, 302b and 302c.

The memory 304 may be configured to store data (e.g. instructions, computer codes etc.). As shown in FIG. 3, the data stored in the memory 304 may include program instructions (e.g. program instructions for implementing methods of embodiments of the present disclosure) and data to be processed (e.g. the memory may store configuration files of other modules, etc.). The processor 302 may also access program instructions and data stored in memory 304 and execute program instructions to operate on data to be processed. The memory 304 may include a volatile storage apparatus or a non-volatile storage apparatus. In some embodiments, the memory 304 may include a Random Access Memory (RAM), a Read-Only Memory (ROM), an optical disk, a magnetic disk, a hard disk, a Solid State Disk (SSD), a flash memory, a storage stick, etc.

The network module 306 may be configured to provide communications with other external devices to the computer device 300 via a network. The network may be any wired or wireless network capable of transmitting and receiving data. For example, the network may be a wired network, a local wireless network (e.g. Bluetooth, WiFi, Near Field Communication (NFC), etc.), a cellular network, the Internet, or a combination thereof. The type of network is not limited to the above-described example.

The peripheral interface 308 may be configured to connect the computer device 300 to one or more peripheral apparatus to enable information input and output. For example, the peripheral apparatus may include an input device such as a keyboard, a mouse, a touch pad, a touch screen, a microphone and various sensors, and an output device such as a display, a speaker, a vibrator and an indicator light.

The bus 310 may be configured to transfer information between various components of the computer device 300

(e.g. the processor 302, the memory 304, the network module 306, and the peripheral interface 308), such as an internal bus (e.g. a processor-memory bus), an external bus (a USB port, a PCI-E bus), etc.

Although the architecture of the above-described computer device 300 only shows the processor 302, the memory 304, the network module 306, the peripheral interface 308, and the bus 310, in implementation, the architecture of the computer device 300 may also include other components necessary to achieve the normal operation. In addition, the architecture of the above-described computer device 300 may contain only components necessary to implement embodiments of the present disclosure, but may not necessarily contain all the above-described components shown in the figure.

Corresponding to the method of any of the above-described embodiments, the present disclosure also provides a non-transient computer-readable storage medium that stores computer instructions, which are used for causing the computer to perform the method 200 as described in any of the embodiments.

A computer-readable medium of the embodiment includes permanent and non-permanent, removable and non-removable media, which may implement information storage by any method or technology. Information may be computer-readable instructions, a data structure, a module of a program, or other data. Examples of storage media of a computer include, but are not limited to, a Phase-change Random Access Memory (PRAM), a Static Random Access Memory (SRAM), a Dynamic Random Access Memory (DRAM), other types of Random Access Memory (RAM), a Read Only Memory (ROM), an Electrically Erasable Programmable Read Only Memory (EEPROM), a flash memory or other memory technology, a Compact Disc-Read Only Memory (CD-ROM), a Digital Versatile Disc (DVD) or other optical storage, a cartridge magnetic tape, a magnetic tape and magnetic disk memory or other magnetic storage device or any other non-transmission medium, which may be used for storing information that may be accessed by a computing device.

The computer instructions stored in the storage medium of the above-described embodiments are used to cause the computer to perform the method 200 as described in any of the embodiments and have the beneficial effects of the respective method embodiments, which are not repeated here.

Corresponding to method 200 of any of the above-described embodiments, the present disclosure also provides a computer program product including a computer program. In some embodiments, the computer program is executable by one or more processors to cause the processor to perform the method 200. Corresponding to execution subjects corresponding to various acts in various embodiments of the method 200, the processor performing a corresponding act may belong to a corresponding execution subject.

The computer program product of the above-described embodiments is used to cause a processor to perform the method 200 as described in any of the embodiments and has the beneficial effects of the respective method embodiments, which will not be repeated here.

Those skilled in the art should understand that the discussion in any of the above embodiments is only exemplary but is not intended to imply that the scope of the present disclosure (including the claims) is limited to these examples. Under the concept of the present disclosure, the above embodiments or the technical features in different embodiments may be combined, and the acts may be implemented in any order. There are many other changes in different aspects of embodiments of the present disclosure as described above, which are not provided in details for simplicity.

In addition, in order to simplify the description and discussion and in order not to make embodiments of the present disclosure difficult to be understood, well-known power/ground connections with an Integrated Circuit (IC for short) chip and other components may or may not be illustrated in the provided drawings. Moreover, an apparatus may be illustrated in a form of a block diagram in order to avoid obscuring embodiments of the present disclosure, and it also considers a following fact, that is, details about implementation modes of apparatuses in these block diagrams highly depend on a platform on which embodiments of the present disclosure will be implemented (that is, these details should be fully within a understanding range of those skilled in the art). With the details (for example, circuits) elaborated to describe the exemplary embodiments of the present disclosure, it is apparent to those skilled in the art that embodiments of the present disclosure may be implemented without these details or in case that these details change. Therefore, these descriptions should be considered illustrative rather than restrictive.

Although the present disclosure is described in combination with embodiments of the present disclosure, many replacements, modifications, and variations of these embodiments are apparent to those skilled in the art according to the previous description. For example, the discussed embodiments may be used for other memory architectures (e.g., a Dynamic RAM (DRAM for short)).

Embodiments of the present disclosure are intended to cover all such alternatives, modifications, and variations that fall in the broad scope of the appended claims. Therefore, any omissions, modifications, equivalent replacements, improvements, etc., made within the spirit and principle of embodiments of the present disclosure shall be included within the protection scope of the present disclosure.

The invention claimed is:

1. An Internet of Things system, comprising:
an Internet of Things terminal, configured to establish a connection with a proxy server by using a connection certificate of the Internet of Things terminal, and send device information and an identity sign of the Internet of Things terminal to the proxy server;
the proxy server, configured to receive the device information and the identity sign, and send the device information and the identity sign to an Internet of Things platform; and
the Internet of Things platform, configured to receive the device information and the identity sign, perform an identity authentication on the Internet of Things terminal according to the device information and the identity sign, and return an authentication success message to the proxy server in response to the identity authentication passing;
wherein the proxy server is further configured to establish a communication connection with the Internet of Things terminal in response to receiving the authentication success message;
wherein the Internet of Things platform comprises a device management service and an identity authentication service;
wherein the Internet of Things terminal is further configured to send an identity authentication request to the Internet of Things platform, and the identity authentication request comprises the device information and an identity certificate of the Internet of Things terminal;
the device management service is configured to authenticate an availability of the Internet of Things terminal according to the device information, and send the device information and the identity certificate to the identity authentication service in response to determining that the Internet of Things terminal is available;
the identity authentication service is configured to perform an identity authentication on the Internet of Things terminal according to the device information and the identity certificate, generate a challenge code corresponding to the Internet of Things terminal in response to the identity authentication passing, and send the challenge code to the Internet of Things terminal;
wherein the Internet of Things terminal is further configured to sign the challenge code and the device information by using a key of the identity certificate to obtain the identity sign.

2. The Internet of Things system according to claim 1, wherein the device management service is configured to authenticate an availability of the Internet of Things terminal according to the device information, and send the device information and the identity sign to the identity authentication service in response to determining that the Internet of Things terminal is available; and
the identity authentication service is configured to perform an identity authentication on the Internet of Things terminal according to the device information and the identity sign.

3. The Internet of Things system according to claim 2, wherein the identity authentication service is further configured to:
search for the identity authentication and the challenge code corresponding to the Internet of Things terminal by using the device information,
authenticate the identity sign by using the searched-out identity certificate, the challenge code and the device information, and
return the authentication success message to the proxy server in response to the identity sign being authenticated.

4. The Internet of Things system according to claim 3, wherein the identity authentication service is further configured to return an authentication failure message to the proxy server in response to the identity sign being not authenticated;
the proxy server is further configured to feed back the authentication failure message to the Internet of Things terminal in response to receiving the authentication failure message, and/or disconnect a connection with the Internet of Things terminal.

5. The Internet of Things system according to claim 1, wherein the Internet of Things terminal is further configured to:
establish a Transport Layer Security (TLS) connection with the proxy server by using the connection certificate;
wherein the device information is used as a user name of the TLS connection, and the identity sign is used as a password of the TLS connection.

6. The Internet of Things system according to claim 2, wherein the Internet of Things terminal is further configured to:

establish a Transport Layer Security (TLS) connection with the proxy server by using the connection certificate;

wherein the device information is used as a user name of the TLS connection, and the identity sign is used as a password of the TLS connection.

7. An authentication and communication method for an Internet of Things system, comprising:

establishing, by an Internet of Things terminal, a connection with a proxy server by using a connection certificate, and sending device information and an identity sign of the Internet of Things terminal to the proxy server;

receiving, by the proxy server, the device information and the identity sign, and sending the device information and the identity sign to an Internet of Things platform;

receiving, by the Internet of Things platform, the device information and the identity sign, and performing an identity authentication on the Internet of Things terminal according to the device information and the identity sign;

returning, by the Internet of Things platform, an authentication success message to the proxy server in response to the identity authentication passing; and establishing, by the proxy server, a communication connection with the Internet of Things terminal in response to receiving the authentication success message;

wherein the Internet of Things platform comprises a device management service and an identity authentication service;

further comprising:

sending, by the Internet of Things terminal, an identity authentication request to the Internet of Things platform, wherein the identity authentication request comprises the device information and an identity certificate of the Internet of Things terminal;

authenticating, by the device management service, an availability of the Internet of Things terminal according to the device information, and sending the device information and the identity certificate to the identity authentication service in response to determining that the Internet of Things terminal is available; and performing, by the identity authentication service, an identity authentication on the Internet of Things terminal according to the device information and the identity certificate, generating a challenge code corresponding to the Internet of Things terminal in response to the identity authentication passing, and sending the challenge code to the Internet of Things terminal;

further comprising:

signing, by the Internet of Things terminal, the challenge code and the device information by using a key of the identity certificate to obtain the identity sign.

8. The method according to claim 7, wherein receiving, by the Internet of Things platform, the device information and the identity sign, and performing the identity authentication on the Internet of Things terminal according to the device information and the identity sign, comprises:

authenticating, by the device management service, an availability of the Internet of Things terminal according to the device information, and sending the device information and the identity sign to the identity authentication service in response to determining that the Internet of Things terminal is available; and

performing, by the identity authentication service, an identity authentication on the Internet of Things terminal according to the device information and the identity sign.

9. The method according to claim 8, wherein performing, by the identity authentication service, the identity authentication on the Internet of Things terminal according to the device information and the identity certificate, comprises:

searching for the identity authentication and the challenge code corresponding to the Internet of Things terminal by using the device information; and authenticating the identity sign by using the searched-out identity certificate, the challenge code and the device information.

10. The method according to claim 9, further comprising:

returning, by the identity authentication service, an authentication failure message to the proxy server in response to the identity sign being not authenticated; and feeding back, by the proxy server, the authentication failure message to the Internet of Things terminal in response to receiving the authentication failure message, and/or disconnecting a connection with the Internet of Things terminal.

11. The method according to claim 7, wherein establishing, by the Internet of Things terminal, the connection with the proxy server by using the connection certificate, comprises:

establishing a Transport Layer Security (TLS) connection with the proxy server by using the connection certificate;

wherein the device information is used as a user name of the TLS connection, and the identity sign is used as a password of the TLS connection.

12. A computer device, comprising at least a processor and a memory storing a computer program runnable in the processor, wherein when the processor executes the program, instructions of the method according to claim 7 are implemented.

13. A non-transitory computer-readable storage medium containing a computer program, wherein, when the computer program is executed by one or more processors, the processor is enabled to perform the method according to claim 7.

14. An authentication and communication method for an Internet of Things system, applied to an Internet of Things terminal, comprising:

establishing a connection with a proxy server by using a connection certificate of an Internet of Things terminal and sending device information and an identity sign of the Internet of Things terminal to the proxy server for the proxy server to send the device information and the identity sign to an Internet of Things platform, and establishing a communication connection between the proxy server and the Internet of Things terminal after an identity authentication passes;

further comprising:

signing a challenge code and the device information by using a key of an identity certificate to obtain the identity sign, wherein the challenge code is generated by the Internet of Things platform and sent to the Internet of Things terminal after the Internet of Things platform verifies that the Internet of Things terminal is available according to the device information, and passes the identity authentication of the Internet of Things terminal according to the device information and the identity certificate.

* * * * *